Nov. 24, 1931. W. P. WATLING ET AL 1,832,953
GAUGE STRUCTURE
Filed July 20, 1928
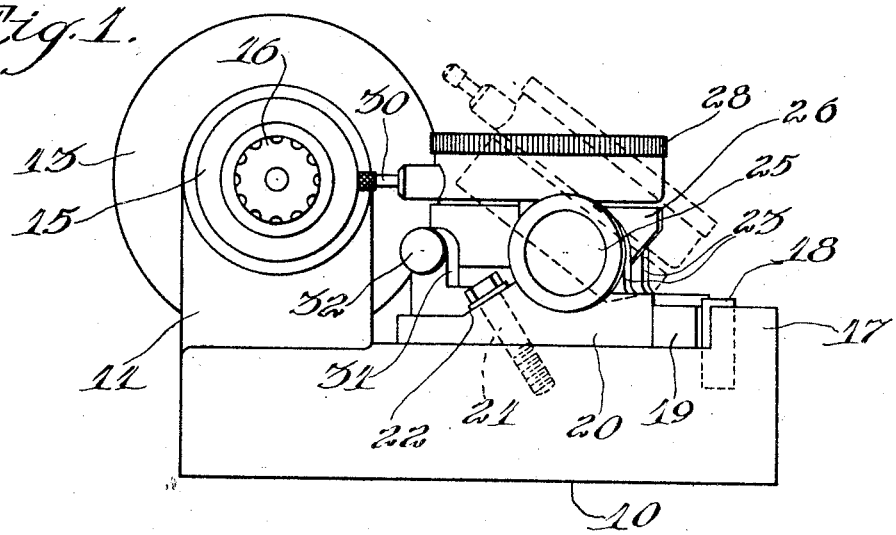
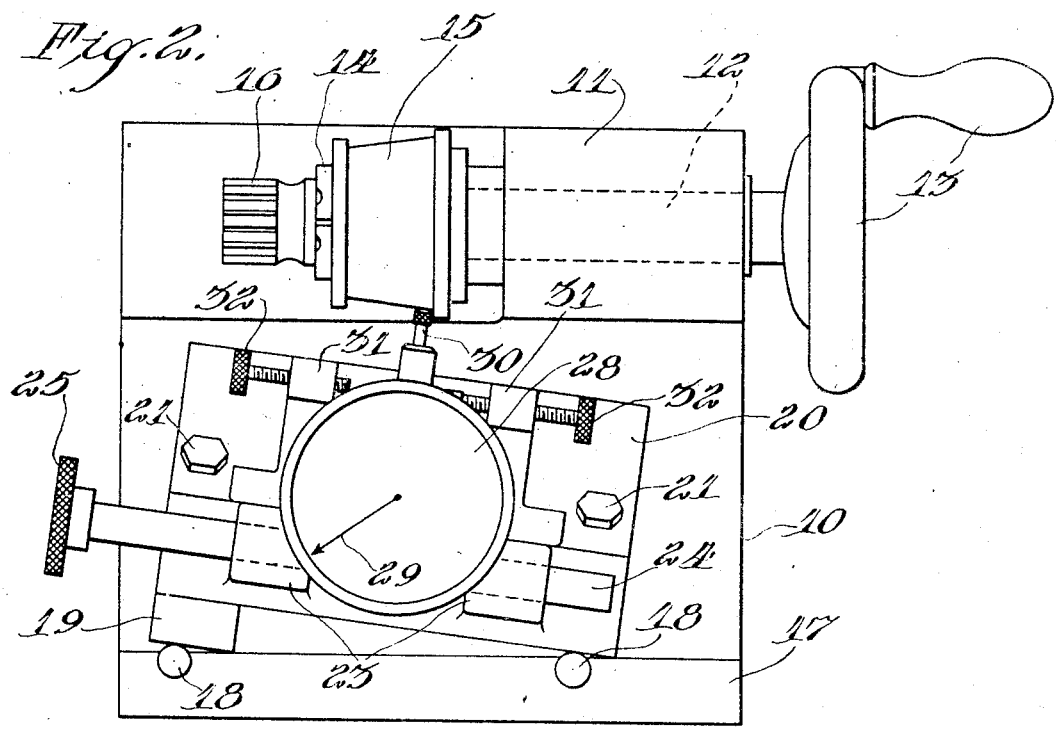
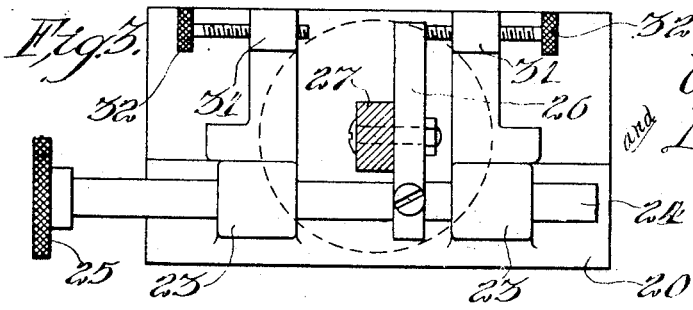
Inventors.
William P. Watling
and Bernard H. Small.

Patented Nov. 24, 1931

1,832,953

UNITED STATES PATENT OFFICE

WILLIAM P. WATLING AND BERNARD F. SMALL, OF CHICAGO, ILLINOIS, ASSIGNORS TO INTERNATIONAL HARVESTER COMPANY, A CORPORATION OF NEW JERSEY

GAUGE STRUCTURE

Application filed July 20, 1928. Serial No. 294,148.

This invention is in a gauge structure.

In the manufacture of roller bearings, and particularly tapered roller bearings, it is essential to the true running of a completed roller bearing of this kind that the cone or tapered sleeve, when finished and ready for assembly, be gauged for its accuracy in measurement. Thus, in the manufacture of these roller bearings it is essential that these tapered cones be gauged for the accuracy of their outer diameter and for their taper or conical surface.

More particularly, therefore, this invention relates to a gauge structure for gauging the taper and outer diameter of such a piece of work.

The objects of the invention are to provide a gauging fixture which can be adjusted to meet all the necessary requirements for gauging the outer diameter and taper of a finished tapered cup or cone for a tapered roller bearing. Another object is to provide such a gauge structure or fixture which is simple and inexpensive and effective for the purpose intended.

These desirable objects are accomplished in the provision of a base which carries a rotatable work holder, there being provided a gauge carrier which is both slidable and tiltable with respect to the work, as will later appear. Means is also provided for limiting the sliding movement of the gauge carrier.

In the drawings,—

Figure 1 is an end view of the improved gauge structure of this invention;

Figure 2 is a plan view thereof; and

Figure 3 is a plan view of the gauge block and carrier with the gauge removed to illustrate the structure therebeneath.

The structure involves any portable form of support or base 10 which may be provided with a bearing standard 11 in which is journaled in a horizontal plane a shaft 12 rotatable by a crank wheel and handle 13 arranged at one end thereof, while the other end of the shaft carries an expansible mandrel or core 14 over which is adapted to be slid the piece of work to be gauged, which herein is in the form of a cone or tapered sleeve for a tapered roller bearing. This piece of work is secured to the said shaft by means of a plug 16 designed to expand the mandrel or core 14 to lock the work 15 so that it will turn with the shaft 12, as will be clear.

The side of the base opposite to the work holder side just described is provided with a wall 17 in which are fitted two removable cylindrical posts 18. A block 19 serves as a spacer adjacent one of the posts 18 to enable the mounting of a gauge carrier block 20 at an angle, as shown in Figure 2, for a purpose later to appear. Bolts 21 pass through the block 20 from a sloped surface 22 so that when the bolts are tightened into the base 10, the carrier block 20 will be caused to be secured to the block 10 and to be wedged against the posts 18.

The spacer block 19, it can now be seen, serves to make the angular disposition of the block 20 such that it will be parallel with the taper of the piece of work 15.

The carrier block 20 is provided with two upright bearing blocks 23 having aligned bores through which is passed for free sliding movement a gauge carrier in the form of a shaft 24 having at one end a finger knob 25. Between the blocks 23 the shaft 24 has secured thereto an arm 26, which in turn carries an upright 27 on which is mounted a gauge which in this illustration is preferably a standard form of indicator having an indicator needle 29 and an operating member 30 arranged to be engageable with the surface of the work 15, as shown in Figure 2. Adjacent each bearing block 23, the carrier block 20 also carries two upright bosses 31 in each of which is adjustably mounted a set screw 32, which set screws function as adjustable stops for the arm 26 to limit the axial sliding movements of the shaft 24, as will be clear. The shaft 24, by means of the knob 25, is also tiltable or rockable, as indicated in dotted lines in Figure 1, to enable the operator to swing the gauge 28 back, so that its operating member 30 will be clear of the work holding structure, as when mounting a piece of work on said structure, or when removing the same therefrom.

In operation, a piece of work 15 is secured to the shaft 12 by means of the plug 16, as has been indicated. The block 20 is mounted on the base 10 by means of the bolts 21, and the spacer block 19 serves to cause the shaft 24 in its sliding movement to move parallel with the surface of the piece of work 15 to be gauged.

The stops 32 are adjusted in the bosses 31 to limit the sliding movement of the shaft and the gauge member 30, as will be clear. The operator, to test the taper of the conical surface of the work and its outer diameter, then slides the shaft 24 back and forth to cause the operating member 30 in the gauge to engage the surface of the cone 15, while at the same time, with his other hand, the operator, by means of the wheel and handle 13, turns the shaft 12. It will now be clear that any inaccuracy as to size in the measurement of the work will cause the operating member 30 to move the needle 29 of the indicator, and, if such movement exceeds certain limits prescribed for manufacturing tolerances, the operator knows the work is not accurate and cannot be used for assembly in a finished tapered roller bearing.

From this description it can now be seen that a gauge structure has been provided which achieves all of the desirable objects heretofore recited. It is to be understood that only an illustrative form of the gauge structure has been shown in this disclosure and that the same may assume other forms in practice. It is the intention to cover all such forms which do not depart from the spirit and scope of this invention, as is indicated in the following claims.

What is claimed as new is:

1. A gauge structure for gauging the surface of a piece of work, said structure comprising a base, a work holder mounted on the base, a shaft journaled on the base and carried at all times for free sliding and turning movement, an indicator secured to the shaft to slide and turn therewith, and an operating member for said indicator adapted to engage the surface of the work.

2. A gauge structure for gauging the tapered surface of a piece of work, said structure comprising a base, a work holder supported on said base, means for turnably mounting the work on said holder, a shaft journaled on the base and carried at all times for free sliding and turning movement, an indicator secured to the shaft to slide and turn therewith, an operating member for said indicator adapted to engage the tapered surface of the work, and means whereby said shaft will slide in parallelism with the taper of the work being gauged.

3. In a gauge structure, a base, a work holder carried by the base and adapted to carry a piece of work to be gauged, stop means mounted in the base, a block located on the base, a shaft slidably and turnably carried by the block, an indicator having a member engageable with the work, said indicator carried fast on the shaft, and means for securing the block to the base and wedging it against the stops.

4. In a gauge structure, a base, a work holder carrier thereby and adapted to carry a piece of work to be gauged, stop means mounted on the base, a block located on the base, a shaft rockably and slidably carried by the block, an indicator carried fast on the shaft and having a member engageable with the work, means to limit the sliding movement of the shaft, and means for securing the block to the base and against the stops.

5. In a gauge structure, a base, a work holder carried thereby and adapted to carry a piece of work to be gauged, stop means mounted on the base, a block also mounted on the base, a shaft rockably and slidably carried by the block, an indicator carried fast on the shaft and having a member engageable with the work, adjustable means supported by the block to limit the sliding movement of the shaft, and means for securing the block to the base and wedging it against the stops.

In testimony whereof we affix our signatures.

WILLIAM P. WATLING.
BERNARD F. SMALL.